United States Patent
Wu et al.

(10) Patent No.: US 6,236,939 B1
(45) Date of Patent: May 22, 2001

(54) METHOD AND APPARATUS FOR CONTROLLING SPACECRAFT ATTITUDE WITH ROTATIONAL STAR TRACKERS

(75) Inventors: Yeong-Wei A. Wu, Rancho Palos Verdes; Douglas H. Hein, Los Angeles, both of CA (US); Garry Didinsky, Niles, IL (US); David L. Augenstein, Hermosa Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/261,727

(22) Filed: Mar. 3, 1999

(51) Int. Cl.[7] .............................. G01C 21/02; G06G 7/78
(52) U.S. Cl. ........................ 701/222; 701/13; 244/164; 244/171
(58) Field of Search ..................................... 701/222, 226, 701/13; 342/359; 455/67.3; 250/330; 244/164, 171

(56) References Cited

U.S. PATENT DOCUMENTS

| | | | |
|---|---|---|---|
| 4,159,419 | * 6/1979 | Wittke | 250/203.1 |
| 5,525,793 | * 6/1996 | Holmes et al. | 250/203.6 |
| 6,047,226 | * 4/2000 | Wu et al. | 701/13 |

OTHER PUBLICATIONS

Liebe, C., "Star Trackers for Attitude Determination", IEEE AES Systems Magazine, pp 10–16, Jun. 1995.*

Liebe et al, "The Advancing State–of–the–art in Second Generation Star Trackers", Aerospace Conference, vol. 5, pp. 243–253, 1998.*

Andy Wu, "Stellar Inertial Attitude Determination For LEO Spacecraft", Proceedings of the 35th Conference on Decision and Control, Kobe, Japan, *IEEE*, Feb. 1996, pp. 3236–3244.

Kunkel et al., "METEOSAT Second Generation Enhanced Viable–/IR Imager SEVIRI and its Environmental Monitoring Potential", Proceedings of the Central Symposium of the International Space Year Conference, held in Munich, Germany, Mar. 30–Apr. 4, 1992, (ESA SP–341, Jul. 1992).

James R. Wertz, Editor, "Recursive Least–Squares Estimators and Kalman Filters", *Spacecraft Attitude Determination and Control*, D. Reidel Publishing Company, pp. 459–468.

* cited by examiner

*Primary Examiner*—Ian J. Lobo
(74) *Attorney, Agent, or Firm*—T. Gudmestad

(57) ABSTRACT

High precision spacecraft attitude determination is produced by specially positioning the spacecraft's star trackers and then filtering out measurement errors produced from star tracker electronics. In addition to the conventional azimuth and elevation controls used for star tracker pointing, the star tracker detector array is rotationally positioned about its boresight so that its pixels are traversed by the imaged star path at an angle within 20° of diagonal. This forces both vertical and horizontal spatial error components in the detector plane to a high frequency range at which they can easily be filtered out in common.

20 Claims, 8 Drawing Sheets

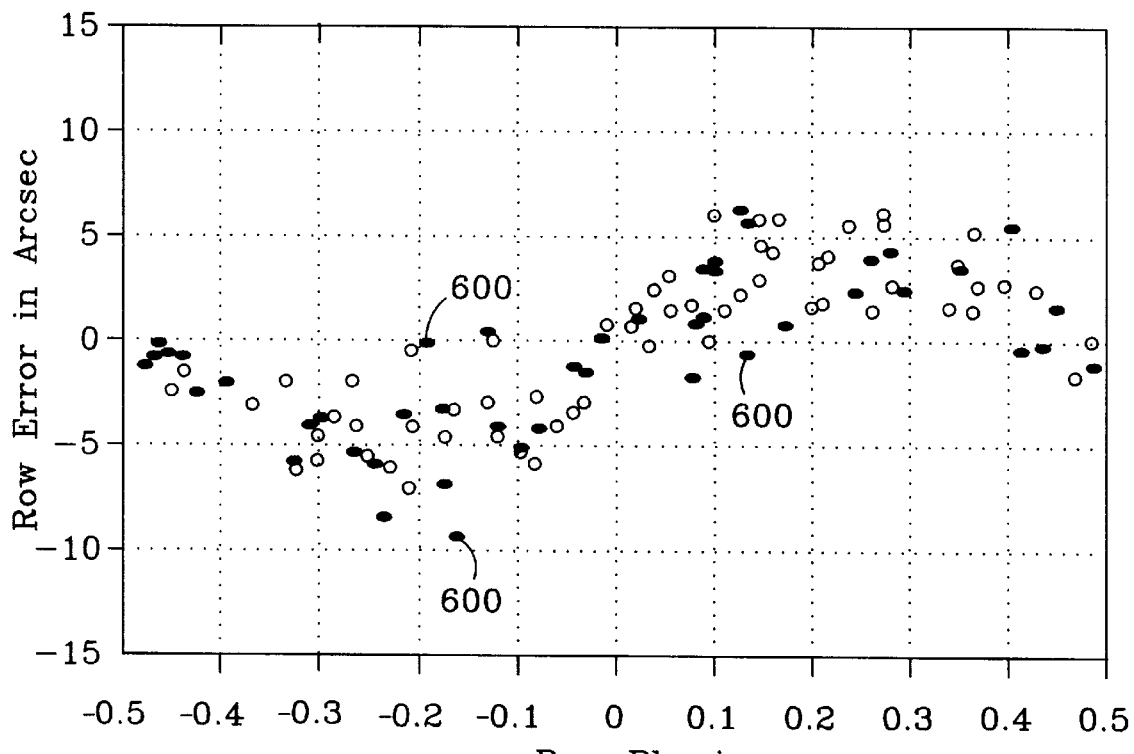
FIG.6
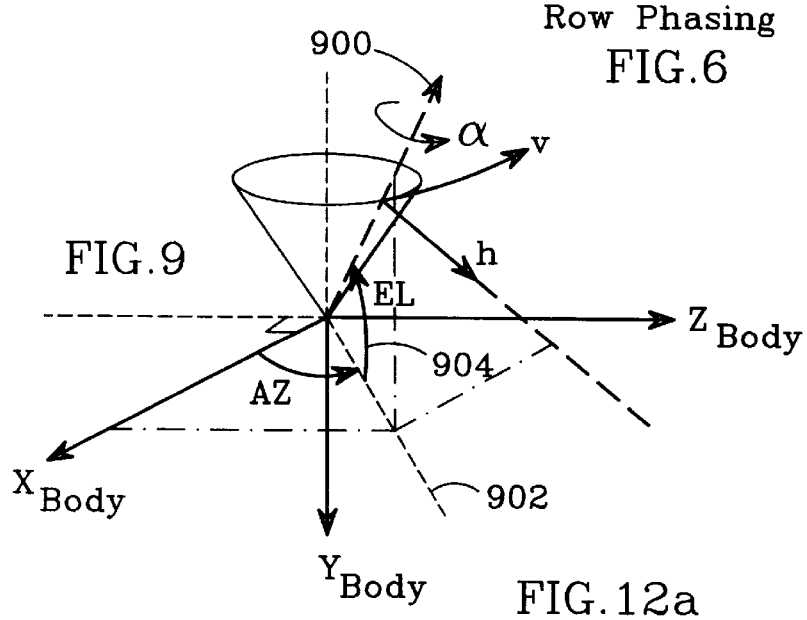
FIG.9
$$\begin{bmatrix} r_S^{ST}(1) \\ r_S^{ST}(2) \\ r_S^{ST}(3) \end{bmatrix} \quad \begin{array}{c} r_S^{ST}(3)\dot{r}_S^{ST}(1) - r_S^{ST}(1)\dot{r}_S^{ST}(3) = \text{constant} \\ r_S^{ST}(3)\dot{r}_S^{ST}(2) - r_S^{ST}(2)\dot{r}_S^{ST}(3) = \text{constant} \\ \text{with} \\ = [C_x(\theta x)][C_y(\theta y)][C_z(\theta z)][C_{ECI}^{body}]r_S^{ECI} \end{array}$$
FIG.12a $$C_x(\theta_x) = \begin{bmatrix} 1 & 0 & 0 \\ 0 & Cos(\theta_x) & -Sin(\theta_x) \\ 0 & Sin(\theta_x) & Cos(\theta_x) \end{bmatrix}$$

$$C_y(\theta_y) = \begin{bmatrix} Cos(\theta_y) & 0 & Sin(\theta_y) \\ 0 & 1 & 0 \\ -Sin(\theta_y) & 0 & Cos(\theta_x) \end{bmatrix}$$

$$C_z(\theta_z) = \begin{bmatrix} 1 & 0 & 0 \\ 0 & Cos(\theta_z) & -Sin(\theta_z) \\ 0 & Sin(\theta_z) & Cos(\theta_z) \end{bmatrix}$$

FIG.12b $$\gamma_s^{st} = \frac{1}{\sqrt{1+h^2+v^2}} \begin{bmatrix} h \\ v \\ 1 \end{bmatrix}$$

$$\gamma_s^{ECI} = \begin{bmatrix} Cos(DEC)\ Cos(RA) \\ Cos(DEC)\ Sin(RA) \\ Sin(DEC) \end{bmatrix}$$

FIG.12c

METHOD AND APPARATUS FOR CONTROLLING SPACECRAFT ATTITUDE WITH ROTATIONAL STAR TRACKERS

BACKGROUND OF THE INVENTION

1. Field of the Invention

The present invention generally relates to the determination and control of spacecraft attitude, and more specifically to a method and system for positioning star trackers to produce low error attitude control signals.

2. Description of the Related Art

Spacecraft such as satellites are used for various purposes including scientific research and communications. In many applications the spacecraft must be positioned in particular attitudes, or orientations, in space. Spacecraft attitude includes roll, pitch, and yaw as described in "Spacecraft Attitude Determination and Control", edited by James R. Wertz, D. Reidel Publishing Company, Boston, U.S.A. 1986, pages 1–21. A precision spacecraft attitude determination using gyros and star trackers was described in Wu and Hein, "Stellar Inerial Attitude Determination for LEO Spacecraft," *Proc. of the* 35 *th Conference on Decision and Control*, Kobe, Japan, December 1996, pages 3236–3244. In this system, a real-time knowledge of spacecraft attitude is computed by numerically integrating gyro data measuring spacecraft dynamic motion, and star tracker data is processed to generate corrections to attitude and gyro rate bias estimates which are provided by a six-state extended Kalman filter. Star trackers used for this purpose are also described in B. Kunkel et al.,"METOSAT Second Generation Enhanced/Visible/IR Imager SERVER I and its Environmental Monitoring Potential", *Proc. of the Central Symposium of the International Space Year Conf.*, Munich, Mar. 30–Apr. 4, 1992.

As used herein, the term "star tracker" includes all star tracking devices which image or project a star onto a pixel array, including but not limited to gimbaled star trackers, fixed head star trackers and star scanners. Star trackers are currently mounted on spacecraft without considering the direction in which an imaged star traverses their CCD (charge coupled device) pixel arrays. Because of star tracker spatially dependent errors stemming from the spatial position and movement of star images across pixel arrays, the attitude determination performance is sensitive not only to the star tracker temporal noise, but also to the tracked star motion across the detectors. Star tracker pointing error varies positively with this star sensor spatially dependent error.

SUMMARY OF THE INVENTION

The present invention seeks to provide a high precision attitude control for spacecraft. This is accomplished by positioning star trackers on the spacecraft so that the images of the stars or other celestial objects being tracked traverse the star tracker's pixel array diagonally. The result is a shifting of noise in the image position. signal towards higher frequencies at which it can be easily removed by a low pass filter. While a 45° traverse angle is optimum for square pixels, significantly improved results can be obtained with traverse angles in the range of 25°–65°. The traverse angle can be generalized for the case of rectangular pixels to be within 20° of $\tan^{-1}(v/h)$, where v and h are respectively the vertical and horizontal pixel dimensions.

The high precision filtered signal is used to calculate and correct the spacecraft's attitude. Simulated results have shown a performance improvement of about 50% with a 45° traverse angle.

These and other features, aspects and advantages of the invention will be better understood from the following detailed description, taken together with the accompanying drawings.

BRIEF DESCRIPTION OF THE DRAWINGS

FIG. 4*a* is a set of graphs illustrating an ideal output error signal with no superimposed temporal errors as a light source diagonally traverses the pixels of a star tracker array, while

FIG. 6 is a graph of the high spatial frequency horizontal error for repeated horizontal pixel scans;

FIG. 9 is a graph illustrating a coordinate reference system for the star tracker optical detector plane;

FIG. 12*a* is a set of equations for the three Euler angles used in 3-axis gimbal motion commands to produce a diagonal traverse of a star image across the star tracker pixels for a generalized mission profile; and FIGS. 12*b* and 12*c* are sets of equations defining terms related to the equations of FIG. 12*a*.

DETAILED DESCRIPTION OF THE INVENTION

This invention improves the accuracy with which a spacecraft can be positioned in space by an improved filtering of spatial errors which occur when the spacecraft's attitude is measured with star trackers having light sensitive pixel arrays. The pixel array is rotated about its boresight to a position at which star images preferably traverse the pixels diagonally. This causes the pixel array to produce high frequency noise in both the vertical and horizontal coordinates of the array's coordinate system. The noise is then filtered with a conventional low pass filter, normally a Kalman filter.

Figure 1A:
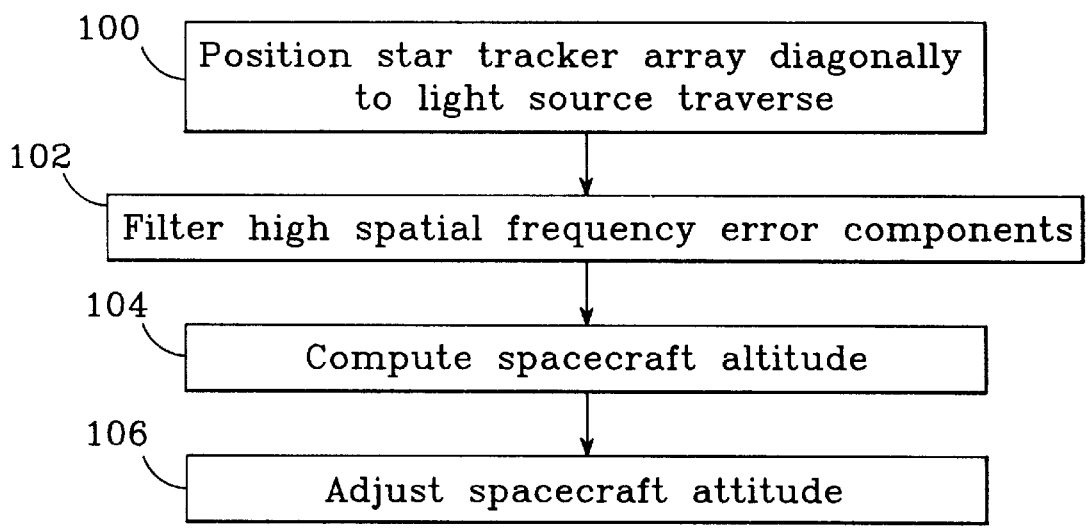
FIG. 1*a* is a flowchart illustrating the new method for controlling spacecraft attitude.

FIG. 1 illustrates the general application of the invention to spacecraft attitude control. In step 100 the star tracker array is positioned diagonally to the path of a light source, such as a star image, which traverses the array. In step 102 the spatial error components in the output of the array are filtered cut. The filtered array output is then used to compute the spacecraft attitude in step 104, and the spacecraft attitude is adjusted in step 106 so that it matches the desired attitude.

Figure 1B:
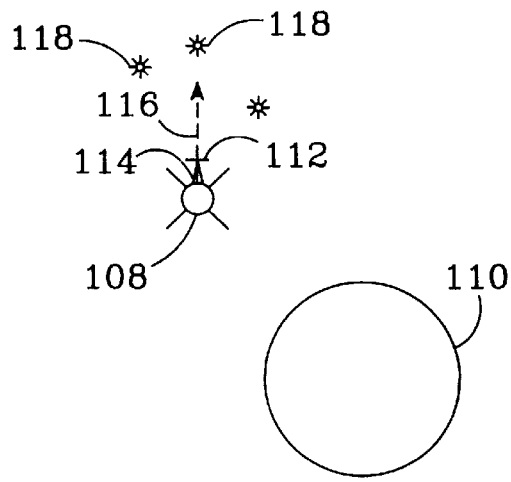
FIG. 1*b* is an illustration of an orbiting spacecraft whose attitude is controlled by a star tracker.

In FIG. 1b a spacecraft 108 such as a satellite is shown orbiting the earth 110. A star tracker 112 is carried by a mounting 114 on the spacecraft and positioned by the mounting so that its boresight 116 is pointing in a desired direction relative to stars 118 to be tracked. The star tracker outputs information from which the spacecraft's attitude may be determined, allowing for any necessary adjustments to be made to hold the spacecraft to its desired attitude. Up to this point the described system of FIG. 1b is conventional. The invention provides for a unique rotational positioning of the star tracker's pixel array about the foresight so as to significantly reduce spatial errors in its output.

Figure 2:
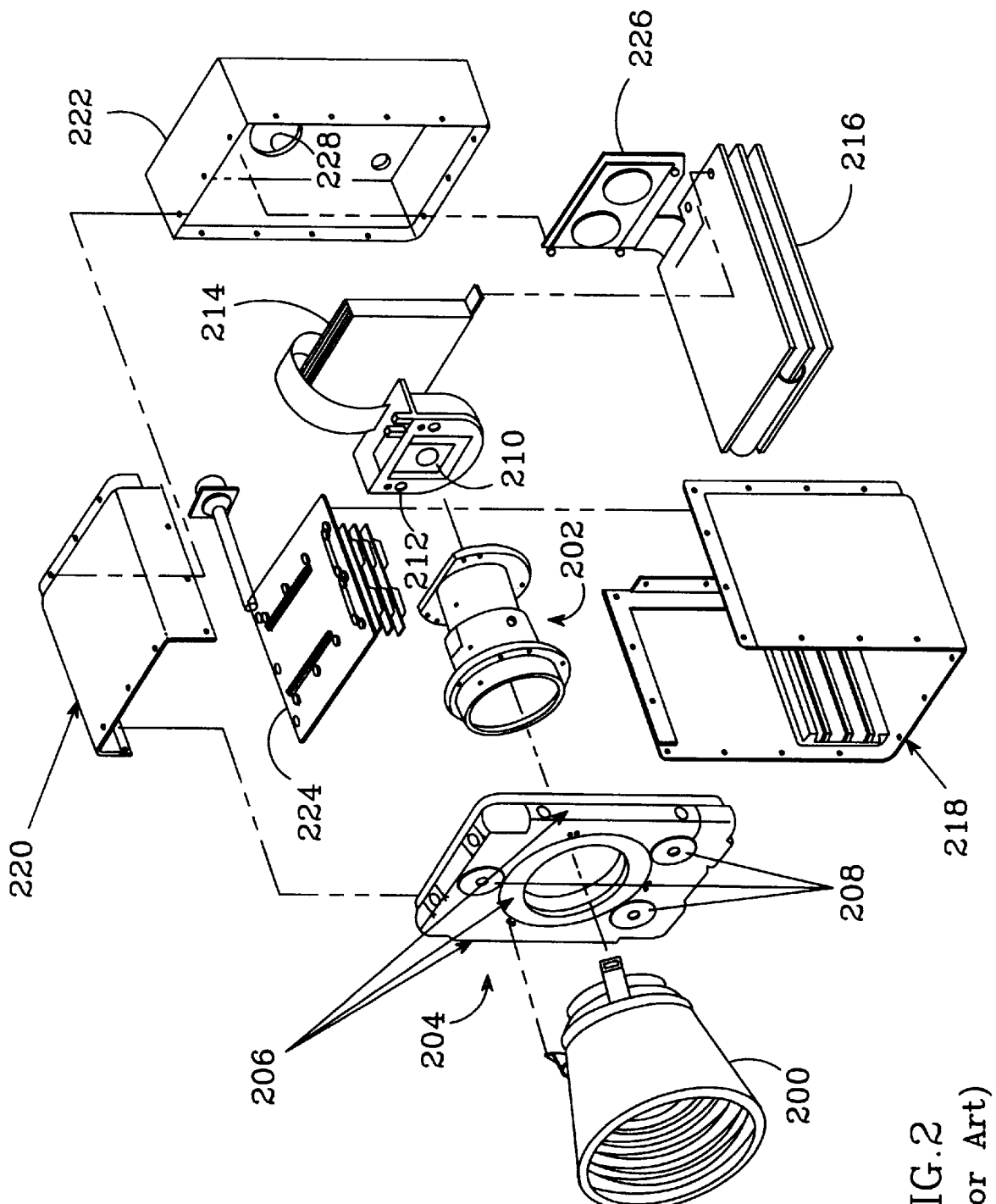
FIG. 2 is an exploded perspective view of a conventional star tracker equipped with a light sensitive pixel array.

FIG. 2 is a perspective view of a known star tracker assembly that can be used in the invention. A light shade 200 shields optics from direct illumination by bright sources such as the Sun, Earth, and Moon. An optical lens assembly 202 is held in a bracket 204 having three optical reference surfaces 206 and three spacecraft interface pads 208. The lens assembly focuses a light source onto a light sensitive CCD pixel array 210 that is cooled by a thermoelectric cooler 212. Focal plane electronics 214 receive the array output and track the movement of imaged light across the array, producing a digital output that is further processed by digital processing electronics 216 to produce a final star movement output that can be used to control the spacecraft attitude. The various components are housed within a housing 218 that includes top and back covers 220 and 222, with the bracket 204 closing the front. A power supply 224 is provided within the housing, while a connector panel 226 provides an electrical interface between the digital processing electronics 216 and the exterior of the star tracker via openings 228 in the back cover 222.

Figure 3A:
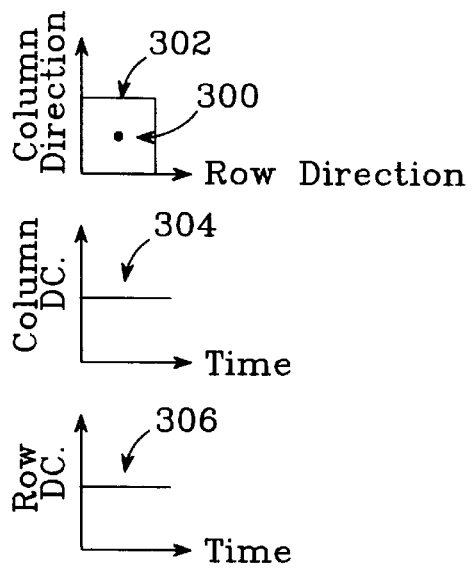
FIGS. 3*a*, 3*b* and 3*c* are sets of graphs respectively representing the DC error signals produced when (a) a light source is stationary on a single pixel within a star tracker's pixel array, (b) a light source travels parallel to the row direction of the pixel array, and (c) a light source travels diagonally to both the row and column directions of the pixel array.
Figure 3B:
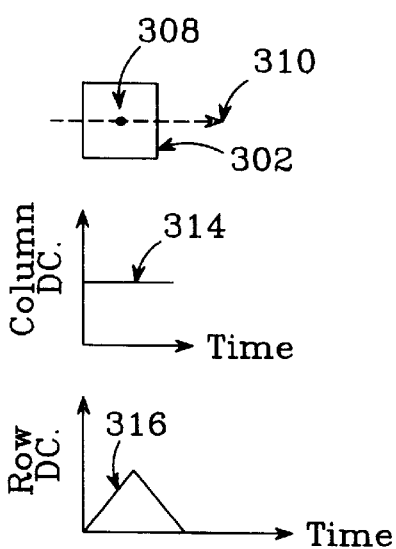
Figure 3C:
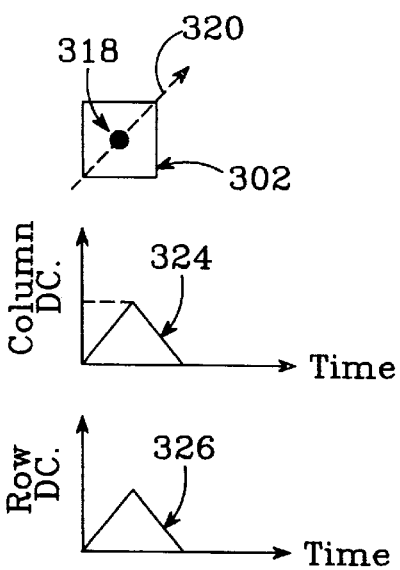

FIGS. 3a, 3b and 3c are sets of graphs that are presented to assist in understanding the invention. They respectively represent DC error signals produced from a star tracker pixel in response to an imaged light source that is stationary on the pixel, that traverses the pixel parallel to the row direction of the pixel array, and that traverses the pixel diagonally.

In FIG. 3a a stationary imaged light source 300 on a single pixel 302 in a star tracker array is labeled with column and row directions that correspond to the two DC error signals produced by the star tracker electronics. The column and row signals are constant values 304 and 306, respectively, since the image position on the pixel is constant over time.

FIG. 3b illustrates the DC error signals produced when the light image 308 traverses the pixel 302 in a direction 310 parallel to the row in which the pixel is located. The column DC error signal 314 is a straight line of constant value, since the image position in the column direction remains unchanged. The row DC error signal 316 ramps up from zero as the imaged light source 308 first enters the pixel 302 and approaches its center, after which it ramps back down to zero as the image recedes from the center and eventually exits the pixel. The resulting saw-tooth shape of the row DC error signal corresponds to the pixel array electronics producing a peak at the center of each pixel in the array. (If the star tracker is configured to output peak error signals at the leading edge where the light image first enters the pixel or at the exiting edge where it exits the pixel, the DC error output signals would not follow the same saw-tooth path, but the important point for purposes of the invention is that the frequency ranges of the error signals associated with the pixel outputs, discussed below, would be the same).

FIG. 3c illustrates saw-tooth DC error signals produced in both the column and row directions when an imaged light source 318 traverses the pixel in a direction 320 that is diagonal to the pixel's row and column directions. The column DC error signal 324 and the row DC error signal 326 both ramp up from the corner of the pixel 302 until the light image reaches the pixel's center, after which both signals ramp down to zero as the imaged light exits the pixel at its opposite corner.

FIG. 3a, 3b and 3c represent ideal DC error signals without temporal error components. However, the actual signals will have temporal error components superimposed on the ideal DC signals due to the inherent inaccuracies of the pixel array and its associated electronics. The ideal case is illustrated in FIG. 4a, which depicts ideal signals with no superimposed errors as an imaged source travels diagonally across multiple pixels in a star tracker array, while FIG. 4b illustrates temporal error signals superimposed on the ideal signal.

Figure 4A:
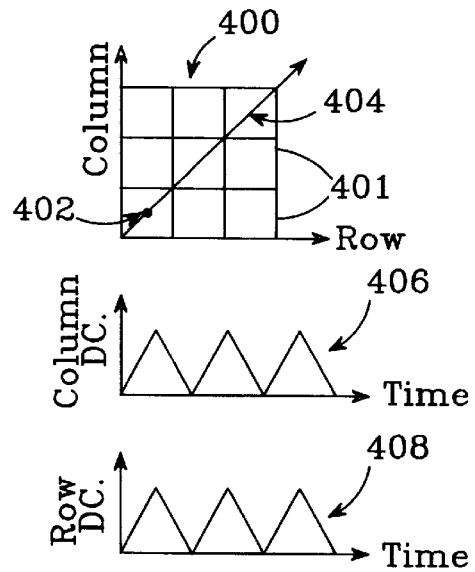

The upper graph of FIG. 4a represents a few pixels 401 from a star tracker pixel array. The partial array 400 is shown with three rows and three columns. An imaged light source 402 travels in a diagonal path 404 across the pixels. The column DC error signal 406 and the row DC error signal 408 are both saw-tooth shaped and shown as ideal temporal error free signals.

Figure 4B:
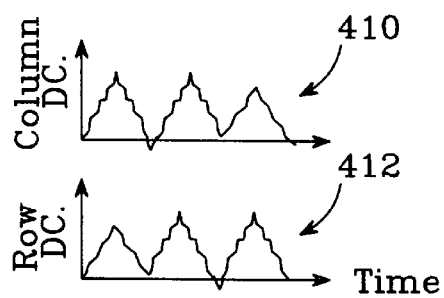
FIG. 4*b* is a set of graphs illustrating the same signals with a superimposed temporal error signal.

In FIG. 4b the column DC error signal 410 and the row DC error signal 412 retain the general saw-tooth shape, but that shape is distorted due to temporal errors adding to and subtracting from the ideal error signal. FIG. 4b is a more accurate representation of the actual DC error signals produced from a star tracker.

Figure 5:
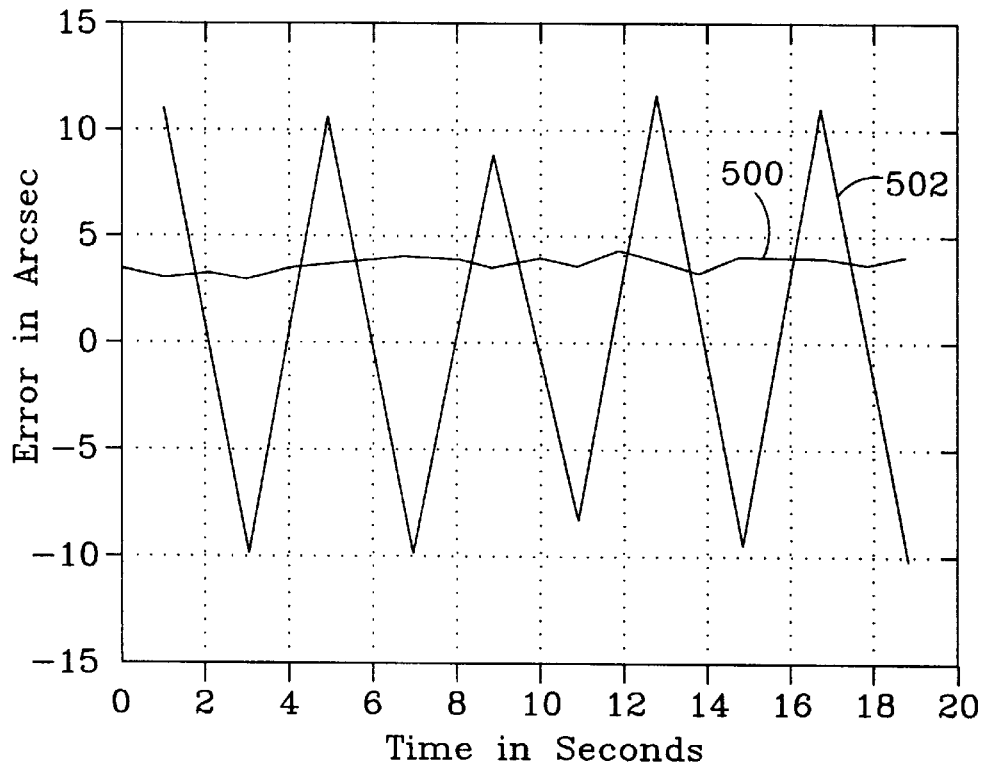
FIG. 5 is a graph illustrating the horizontal and vertical error components resulting from a horizontal image traverse across a star tracker pixel.

The invention recognizes a difference between the errors in the vertical and horizontal (column and row) signal components when the light image traverses the pixels in an array either vertically or horizontally, and uses this difference to force both error components into a regime where they can be easily removed from the desired output signal. Specifically, it has been noted that, for horizontal star motion across a star tracker CCD array, the horizontal position error has a relatively high frequency (determined by the rate of star motion and the pixel sizes) and very little DC bias, whereas the vertical position error has a significant DC bias. This is illustrated in FIG. 5, in which traces of the vertical and horizontal position errors as a function of time are indicated by reference numbers 500 and 502, respectively. The horizontal error 502 has a period of 4 seconds, corresponding to the time required for the star image to traverse one pixel, and a corresponding frequency of 0.25 Hz. However, it has a near-zero average error (or DC bias). The vertical error 500, on the other hand, while exhibiting a very low amplitude variation, has a large average error. The Kalman filters typically used to remove star tracker errors are low pass filters which greatly attenuate the relatively high frequency 0.25 Hz error signals but pass the bias errors. A relatively high error accordingly remains in the star tracker output.

FIG. 6 is a graph showing measured values of the high spatial frequency horizontal error signal as a function of pixel position in the horizontal (row) direction for repeated horizontal star traverses. The row position error in arcsec is given on the vertical axis, while the pixel position to the left or right of center (zero) is given in tenths of the pixel width on the horizontal axis. While a considerable variance in the absolute error values 600 is noted for successive traverses, a generally S-pattern with the high frequency error pattern discussed above emerges.

The invention makes use of the fact that, when a star image traverses a pixel diagonally rather than vertically or horizontally, both the vertical and the horizontal errors will be in a relatively high frequency range removable by a Kalman filter, without significant DC bias. The invention adds a third degree of positional control to the azimuth and elevation controls typically used for star trackers: a rotational control that rotates the pixel array to a position at which it is traversed diagonally by star image movement when it is pointed in the right direction. This forces both the vertical and the horizontal errors into the high frequency range, allowing them both to be removed by the Kalman filter.

Figure 7:
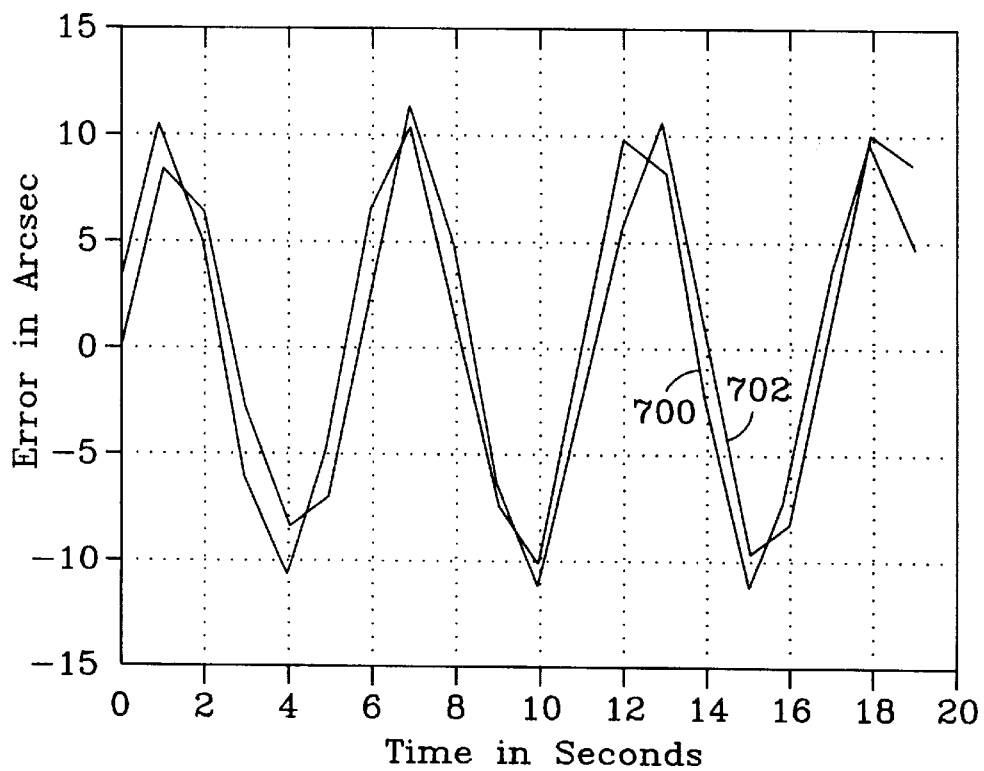
FIG. 7 is a graph illustrating the horizontal and vertical errors resulting from a diagonal image traverse across star tracker pixels.

The vertical and horizontal errors 700 and 702 resulting from a diagonal traverse are illustrated in FIG. 7 for the same pixel sizes and star movement as FIG. 5. Both error functions have frequencies of about 0.17 Hz with little or no DC bias. The frequency is less than the 0.25 Hz noted for a horizontal traverse because it takes longer to cross a pixel diagonally, but the somewhat lower frequency is still easily removable by a Kalman filter.

Figures 8A, 8B, 8C:
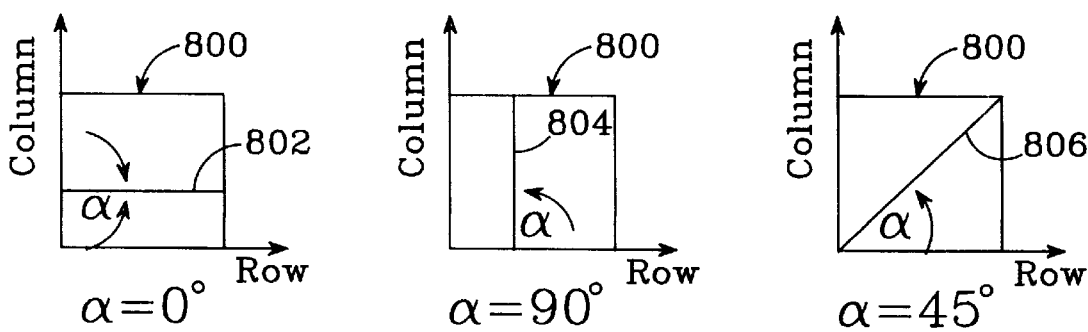
FIGS. 8*a*, 8*b* and 8*c* are graphs illustrating the traverse angle a respectively for horizontal, vertical and diagonal pixel traverses.

While a traverse angle of 45° (for a square pixel) gives optimum results, significant levels of error reduction can still be achieved for other traverse angles from about 25° to about 65°. For more generalized rectangular pixels, the optimal solution for the star traverse angle a is $\alpha=\tan^{-1}(v/h)$, where v and h are the pixel vertical and horizontal dimensions, respectively. In this case the actual value of $\alpha$ can be within about 20° of the ideal value and still achieve a significant improvement in error reduction. $\alpha$ values of 0°, 90° and 45° are illustrated in FIGS. 8a, 8b and 8c, respectively, in which the star paths across a square pixel 800 are indicated by reference numbers 802, 804 and 806, respectively.

FIG. 9 illustrates the star tracker mounting geometry. A 3-dimensional frame of reference $X_{body}$, $Y_{body}$ and $Z_{body}$ is provided by the spacecraft body. The star tracker's boresight 900 is conventionally established within this framework in terms of azimuth given as the angle from the X axis to a boresight projection 902 onto the x, z plane, and an elevation angle 904 from the x, z plan in the y direction. The star tracker's detector array lies in a plane at right angles to the boresight, with vertical (v) and horizontal (h) coordinates. In accordance with the invention, the detector array is further defined by the angle $\alpha$ at which the v, h plane is rotated about the boresight 900.

Figure 10:
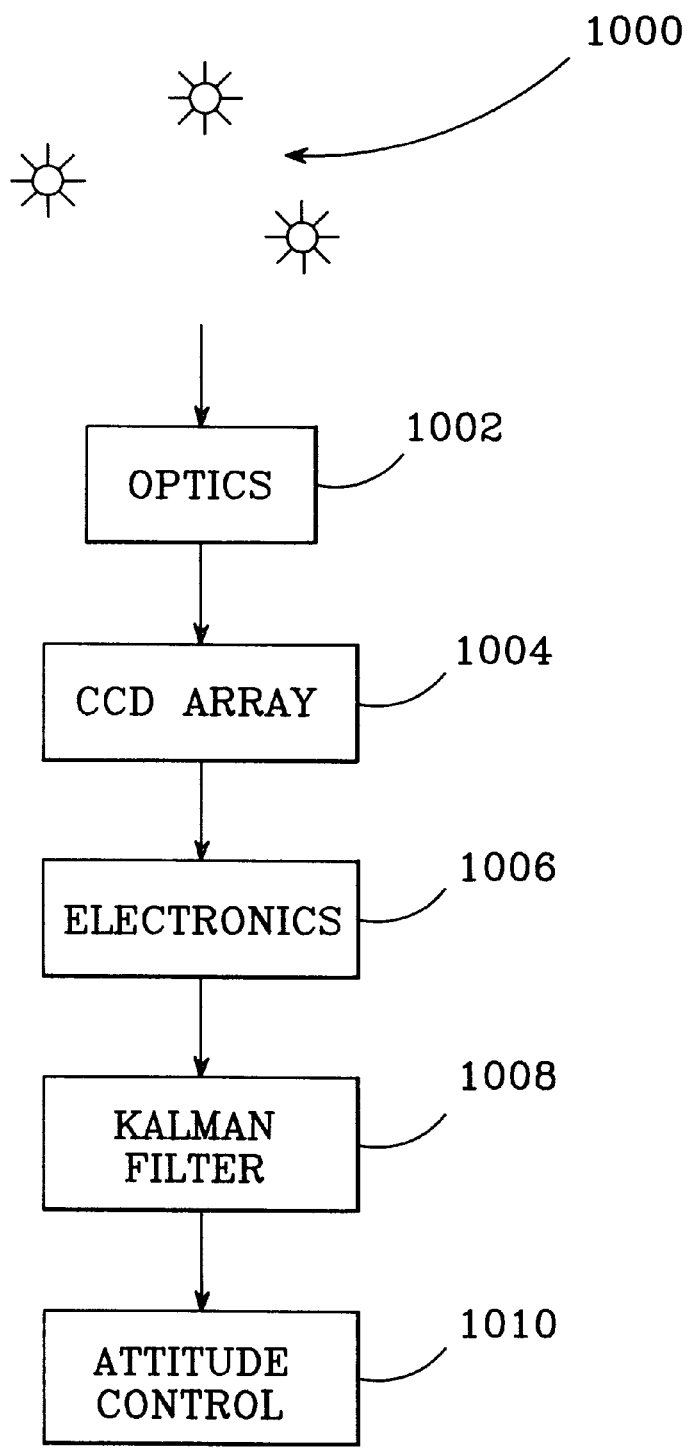
FIG. 10 is a flowchart illustrating a conventional method of controlling spacecraft attitude.

FIG. 10 is a flowchart illustrating a conventional method of controlling spacecraft attitude. Photons emitted from stars 1000 are received by the star tracker's optics 1002 and imaged onto the star tracker's light sensitive pixel array, typically a CCD 1004. The star tracker electronics 1006 convert the CCD output into DC signals that are then processed by a Kalman filter 1008 and inputted into the spacecraft attitude control system 1010.

Figure 11:
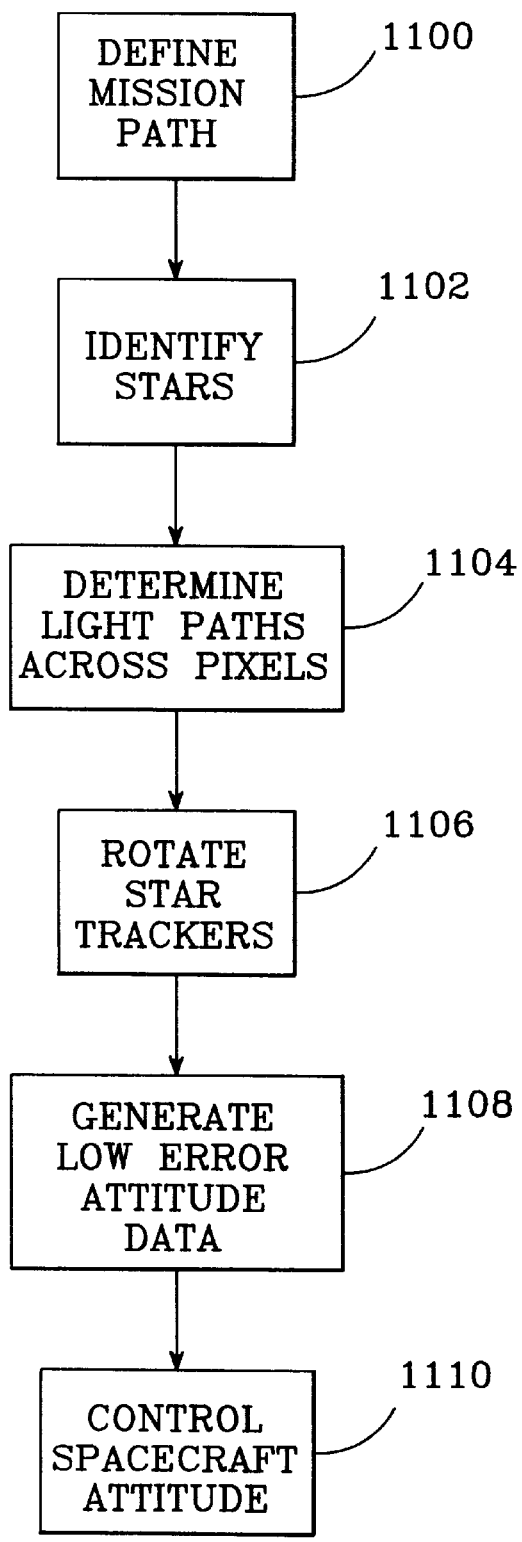
FIG. 11 is a flowchart graph illustrating the method employed by the invention to improve spacecraft attitude control.

The invention rotationally positions the star tracker so that its pixels are traversed by star images to within 20° of diagonal, preferably with minimum deviation from diagonal. This technique is illustrated in FIG. 11. Once the spacecraft's mission path has been defined (1100) and the stars which each of its star trackers are to follow have been identified (1102) so as to develop a star catalog, the star paths across their respective star tracker pixels is determined (1104). The star trackers are then rotated so that their pixels are traversed by imaged starlight at the desired angle (1106), normally diagonally. Adjustments to the star tracker rotational positions can be made inflight if necessary by conventional telepathy communications from earth or from another source in space. A feedback system may also be added to detect any deviations from the desired rotational position, such as by detecting the DC error signal past the Kalman filter exceeding a threshold level, and to automatically rotate the star tracker to bring the error level back to acceptable limits.

Low error attitude data is generated inflight (1108) using conventional techniques but based upon the low error signals from the star trackers, and this data is used to control the spacecraft attitude in a conventional manner (1110).

For a geosynchronous earth orbit (GEO) or a low earth orbit (LEO) earth pointing mission, a single degree of freedom rotation around the star tracker boresight can be used to maintain a near diagonal star image motion across the CCD array. However, for a more general mission profile, to produce a diagonal star image motion the star tracker needs to be mounted on a mechanism 114 such as a 3-axis gimbal platform, which provides motion with 3 degrees of freedom. In this case, the 3-axis gimbal motion commands (in terms of three Euler angles) are generated to control the star tracker boresight such that:

$\dot{h}=\dot{v}=$constant, where $\dot{h}$ and $\dot{v}$ denote the derivatives of star horizontal and vertical position at the CCD array, and the three Euler angles, $\theta_x, \theta_y, \theta_z$, satisfy the equations given in FIG. 12a, where $\gamma_s^{st}$ is the sensed star unit vector in the star tracker reference frame; $\gamma_s^{ECI}$ is the star unit vector in the Earth Center Inertial (ECI) reference frame; $C_{ECI}^{body}$ is the 3×3 direction cosine matric representing spacecraft inertial attitude, and $C_x(\theta_x), C_y(\theta_y), C_z(\theta_z)$ given in FIG. 12b are three 3×3 rotational matrices. Star unit vectors $\gamma_s^{st}$ and $\gamma_s^{ECI}$ are given in FIG. 12c, where RA and DEC are star right ascension and declination angles, repsectively.

The invention increases the precision of attitude control and spacecraft pointing performance. Missions such as directing a laser beam onto a specific location on the earth, or establishing a precise orbit around a planet, require a precise pointing performance.

The invention has been found to improve overall spacecraft attitude control on the order of 50%. In one simulated comparison with a star centroid position accuracy of 3 arcsec, 1δ per axis per star, roll error was reduced from about 0.75 to about 0.52 arcsec, pitch error from about 1.05 to about 0.57 arcsec, and yaw error from about 0.88 to about 0.40 arcsec.

Still higher precision attitude determination may be achieved with smaller pixels having a higher spatial resolution. Present pixel arrays have spatial resolutions down to about one-tenth of an arcsec; smaller pixels with lesser spatial resolutions would increase attitude precision.

While particular embodiments of the invention have been shown and described, numerous variations and alternate embodiments can be made without departing from the spirit and scope of the invention as defined in the appended claims.

We claim:

1. A method of high precision spacecraft attitude control using a star tracker which produces an attitude correction signal based upon sensed star light, said attitude correction signal including both vertical and horizontal spatial error components, comprising:

orienting said star tracker E30 that both of said error components are filterable in common, filtering said error components from said attitude signal in common, and controlling the spacecraft attitude based upon the filtered attitude signal.

2. The method of claim 1, said star tracker including detectors which are arranged in an array defined by a vertical-horizontal coordinate system orthogonal to the star tracker boresight and have generally rectangular shapes with respective vertical (v) and horizontal (h) dimensions, wherein said detectors are oriented so that they are traversed by sensed star light at an angle α relative to said vertical coordinate, wherein α is within 20° of $\tan^{-1}(v/h)$.

3. The method of claim 1, wherein α is equal to approximately $\tan^{-1}(v/h)$.

4. The method of claim 3, wherein said star tracker detectors are generally square and α is within the range of 25°–65°.

5. The method of claim 4, wherein α is approximately 45°.

6. A method of orienting a star tracker having an array of detector pixels to reduce spatial errors associated with the movement of a star image across said array, said array oriented in a vertical-horizontal coordinate system wherein parallel and orthogonal movements of a star image relative to one of said coordinates produce high and low frequency spatial noise, respectively, in the star tracker output, comprising:

rotationally positioning said array within said coordinate system so that it is traversed by a star image at an angle that produces spatial noise in the star tracker output which has high frequency components in both the vertical and horizontal coordinates, and filtering said noise with a low pass filter.

7. The method of claim 6, wherein said array is rotated about the star tracker boresight.

8. The method of claim 6, wherein said star tracker is mounted on a spacecraft and the filtered star tracker output is used to control the spacecraft attitude.

9. The method of claim 6, said pixels having generally rectangular shapes with respective vertical (v) and horizontal (h) dimensions and arranged in rows and columns within said array, wherein said array is rotationally positioned so that the pixels are traversed by sensed starlight at an angle α relative to said vertical coordinate, wherein α is within 20° of $\tan^{-1}(v/h)$.

10. The method of claim 9, wherein α is equal to approximately $\tan^{-1}(v/h)$.

11. The method of claim 9, wherein said pixels are generally square and α is within the range of 25°–65°.

12. The method of claim 11, wherein α is approximately 45°.

13. A spacecraft attitude control system, comprising:

a star tracker mounted on the spacecraft to produce an output signal indicating star motion relative to the star tracker, a filter which filters high frequency spatial error components from the star tracker output, a spacecraft attitude control which responds to the filtered star tracker output to control the spacecraft attitude, and a star tracker positioner which positions the star tracker so that the predominant spatial error in its output is within the high frequency range of said filter, said star tracker including an array of detector pixels oriented in a vertical-horizontal coordinate system wherein parallel and orthogonal movements of a star image relative to one of said coordinates produces high and low frequency spatial noise, respectively, in the star tracker output, and wherein said star tracker positioner rotationally positions said star tracker array within said coordinate system so that it is traversed by a star image at an angle that produces spatial noise in the star tracker output which has high frequency components in both the vertical and horizontal coordinates.

14. The spacecraft attitude control system of claim 13, wherein said star tracker positioner rotates said array about the star tracker boresight.

15. The spacecraft attitude control system of claim 13, wherein said pixels have generally rectangular shapes with respective vertical (v) and horizontal (h) dimensions and are arranged in rows and columns within said array, and said star tracker positioner rotationally positions said array so that the pixels are traversed by sensed star light at an angle α relative to said vertical coordinate, wherein α is within 20° of $\tan^{-1}(v/h)$.

16. The spacecraft attitude control system of claim 15, wherein α is equal to approximately $\tan^{-1}(v/h)$.

17. A star tracker system, comprising:

a star tracker which produces an output signal indicating star motion relative to the star tracker, a filter which filters high spatial frequency error components of the star tracker output, and a star tracker positioner which positions the star tracker so that the predominant spatial error in its output is within the high frequency range of said filter, said tracker including an array of detector pixels oriented in a vertical-horizontal coordinate system wherein parallel and orthogonal movements of a star image relative to one of said coordinates produces high and low frequency spatial noise, respectively, in the star tracker output, and wherein said star tracker positioner rotationally positions said star tracker array within said coordinate system so that it is traversed by a star image at an angle that produces spatial noise in the star tracker output which has high frequency components in both the vertical and horizontal coordinates.

18. The star tracker system of claim 17, wherein said star tracker positioner rotates said array about the star tracker boresight.

19. The star tracker system of claim 17, wherein said pixels have generally rectangular shapes with respective vertical (v) and horizontal (h) dimensions and are arranged in rows and columns within said array, and said star tracker positioner rotationally positions said array so that the pixels are traversed by sensed star light at an angle α relative to said vertical coordinate, wherein α is within 20° of $\tan^{-1}(v/h)$.

20. The star tracker system of claim 19, wherein α is equal to approximately $\tan^{-1}(v/h)$.

* * * * *